March 7, 1950     T. D. STANTON     2,499,693
PNEUMATIC COTTON PICKER NOZZLE

Filed March 24, 1945     3 Sheets-Sheet 1

INVENTOR,
Thomas D. Stanton
BY Zugelter & Zugelter
Atty's.

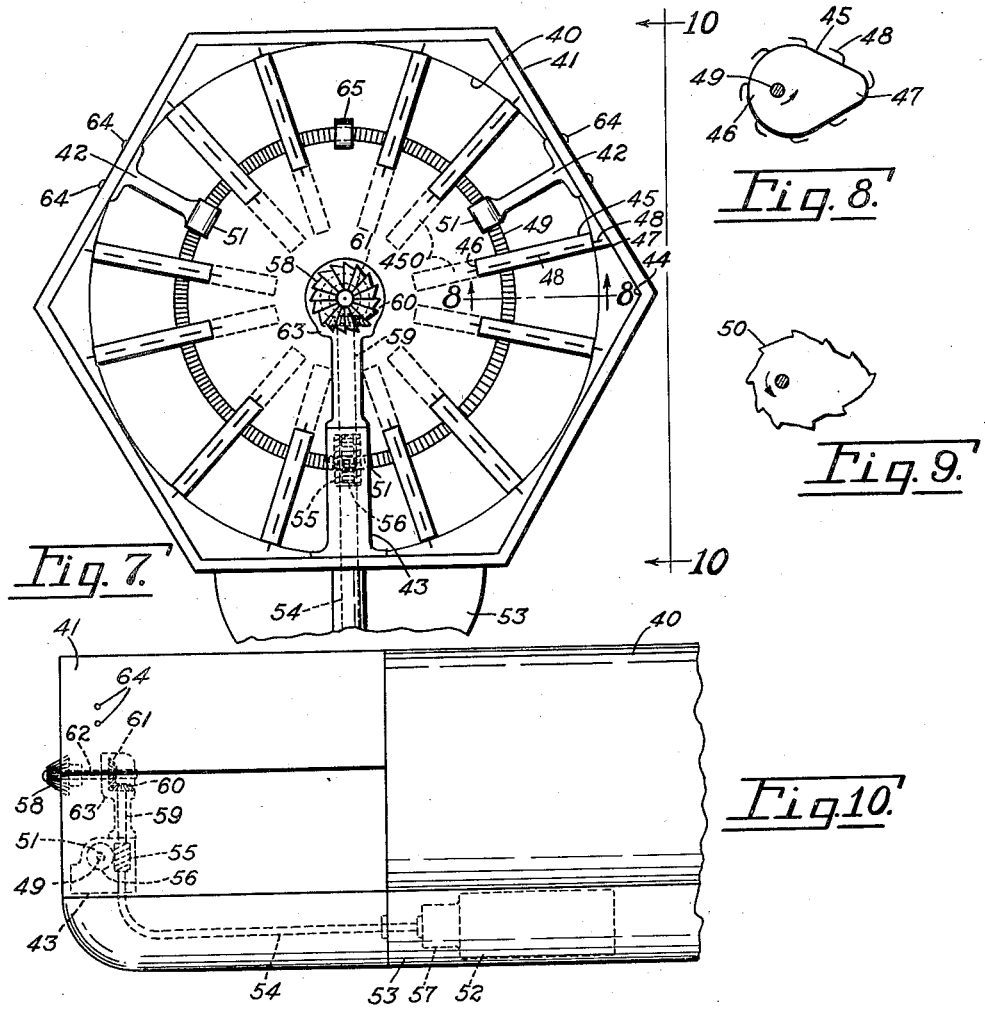

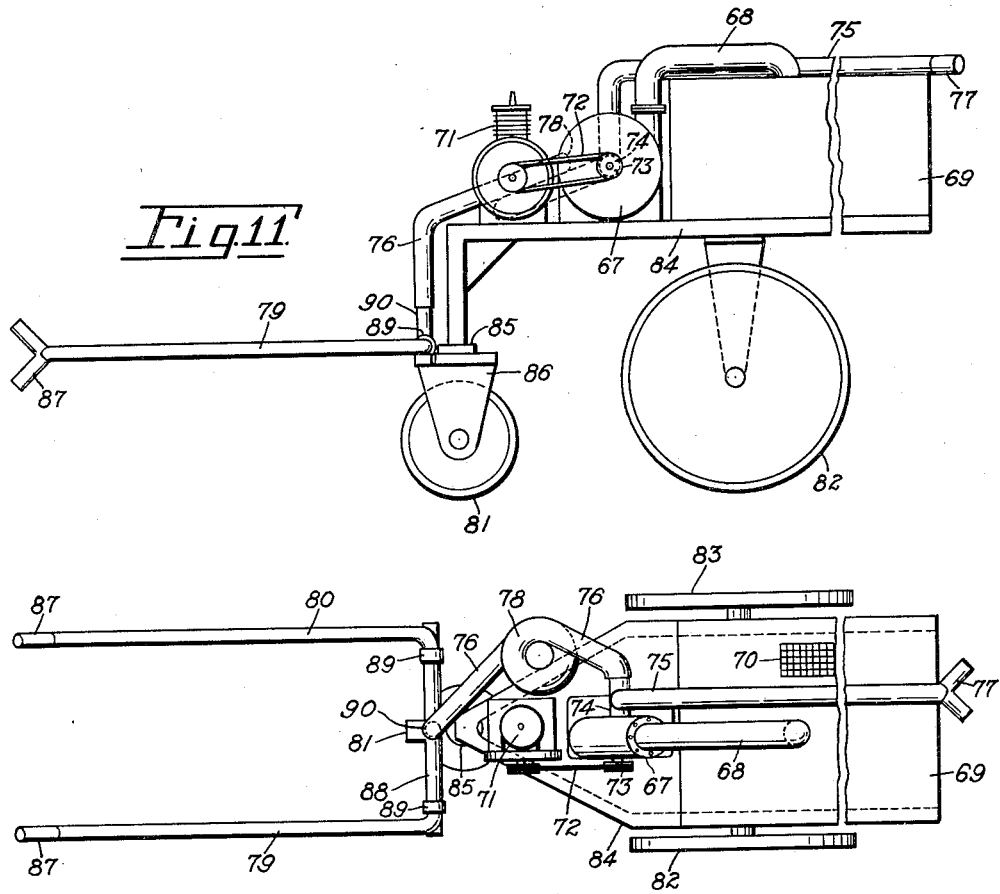

Patented Mar. 7, 1950

2,499,693

UNITED STATES PATENT OFFICE 2,499,693

PNEUMATIC COTTON PICKER NOZZLE

Thomas D. Stanton, Cincinnati, Ohio

Application March 24, 1945, Serial No. 584,672

4 Claims. (Cl. 56—32)

This invention relates to an improvement in a pneumatic picker for various forms of fruits, including blooms, flowers and the like, of which cotton is an example.

An object of the invention is to provide structural improvements in a pneumatic picker, for enhancing and expediting the picking procedure, and avoiding the harvesting of leaves, trash and the like.

Another object is to provide an improved picker nozzle element which is simple, inexpensive and serviceable, the use of which materially increases the rate at which a crop may be harvested.

Another object is to provide a pneumatic nozzle of the character referred to, which may be manipulated with ease and safety, and without fatigue to the operator.

Another object is to provide an improved pneumatic picker nozzle incorporating driven means for plucking the lock, in the case of cotton, for example, and severing it from the burr, the power requirements of the driven means being negligible.

The foregoing and other objects are attained by the means described herein and disclosed in the accompanying drawing, in which:

Fig. 7 is an end view of a third modification of the nozzle element, incorporating a certain type of gripper assembly.

Fig. 8 is a cross-sectional detail view taken on line 8—8 of Fig. 7, showing a gripper element.

Fig. 9 is a view similar to Fig. 8, showing a modification of the Fig. 8 gripper element.

Fig. 10 is a fragmentary side view taken on line 10—10 of Fig. 7, showing the nozzle element of Fig. 7.

Fig. 11 is a side view of a wheeled accumulator for the substance or articles picked by means of the nozzle elements aforesaid.

Fig. 12 is a top plan view of the same.

In order to avoid the use of many alternative terms and superfluity of explanation, the present invention will be described in connection with its use as a picker of cotton, although it will be readily understood to lend itself to the picking of various kinds of flowers, blooms, fruits, and the like. It is intended, therefore, that the present disclosure shall be read and understood merely as setting forth an exemplary use for purposes of clarity and simplicity of understanding, without limiting the invention to any one of its many possible uses.

In the past, various forms of apparatus have been proposed for expediting and facilitating the picking of cotton and the like, utilizing the force of a vacuum in conjunction with mechanical means for positively severing the lock from the plant. One form of such apparatus is represented in the patent to W. A. Stone No. 1,340,125 issued January 8, 1924. Although it was found that mechanical cotton pickers generally failed to perform the required service, no primary fault was seen to exist in the general idea of providing an accumulator in the form of a wheeled carriage incorporating a power driven exhaust fan, to furnish the necessary suction for a nozzle, or a battery of nozzles, designed for the purpose of plucking the cotton locks from the plant; however, considerable difficulty was experienced in designing a serviceable and effectively operative nozzle capable of detaching the locks and feeding them to the accumulator by way of the suction line. Without some effective means of initially detaching the lock from the plant, the apparatus proved to be a complete failure, and the lock detachers heretofore proposed likewise have failed of their purpose principally because of complexity of design and their liability to get out of order at frequent intervals, so that much time and effort and the services of a mechanic were always required in order to maintain the apparatus in an operative condition.

The objections above referred to have been practically eliminated by means of the present invention, which, in one of its forms, provides a simple, inexpensive, and trouble-free nozzle structure including a lock detacher requiring no direct mechanical connection with a source of power. The lock detacher in this case is built into the nozzle element, and is driven and actuated solely by means of the flow of air through the nozzle resulting from constantly maintaining a vacuum therein.

Figure 1:
Fig. 1 is a fragmental perspective view of the improved nozzle element attached to a flexible suction hose.

Referring to the accompanying drawing, Fig. 1 illustrates the nozzle element 7 attached to a suction hose 8 such as might be applied to the suction apparatus illustrated in the aforesaid Stone patent, or in the aparatus of Figs. 11 and 12 herein. The nozzle has an inlet port or mouth 9, preferably unrestricted in size, and into which cotton or the like is drawn by means of the vacuum maintained within the nozzle and its associated suction hose. In that form of the device illustrated by Figs. 2 and 3, there is mounted within the nozzle element a bearing bracket 10 carrying suitable anti-friction bearings 12 and 13, which support for free rotation the spindle 14 of the lock detacher. The bracket preferably supports the detacher spindle axially of the nozzle element, and the bracket preferably is so designed as to offer the least possible resistance or obstruction to passage of the cotton mass through the nozzle and into the suction hose. The forward end of the spindle 14 carries a fixed or integral knob or head 15 that rotates with the spindle, and directly behind said knob or head the spindle may carry a series of impeller blades 16 preferably shaped to induce rotation of the spindle as a substantial current of air moves through the nozzle from the inlet 9 toward the flexible hose 8. It is to be understood that the impeller comprising the blades 16 may be of any acceptable design, the only requirement being that it serve to rapidly rotate the knob or head 15, and that it be free of projections or rough surfaces that might hold the cotton mass rather than allow it to proceed through the nozzle and into the suction hose under the influence of the vacuum therein maintained.

Figures 2, 3:
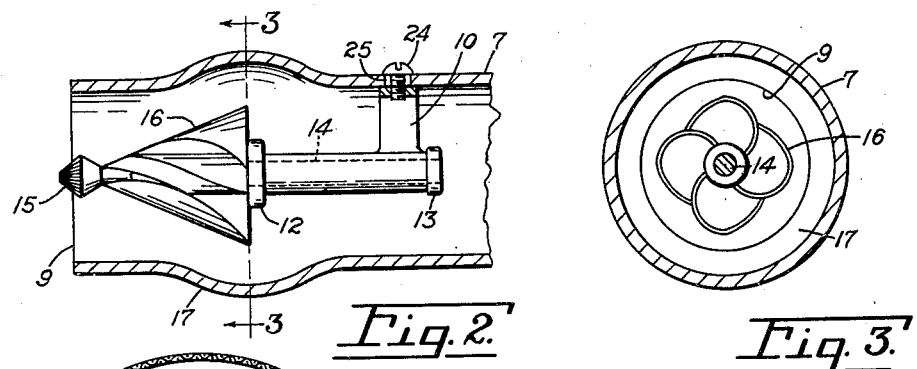
Fig. 2 is a fragmental vertical section taken through the forward end of the nozzle element of Fig. 1.
Fig. 3 is a cross-sectional view taken on line 3—3 of Fig. 2.

Inasmuch as the impeller will in any case exceed in diameter the size of the knob or head 15, it is considered desirable to furnish the nozzle in the region of the impeller, with an interior enlargement or bulbous section 17 in order to provide clearance necessary for free passage of the cotton mass from the inlet 9 to the suction hose 8. The enlargement 17 may be located ahead of the bearing bracket as illustrated by Fig. 2, or it may be located behind the bracket as suggested by Fig. 4.

The purpose of the head or knob 15 is to initially contact the lock and twist it from the burr, so that the lock will be free to move into the nozzle as soon as detachment is effected. Accordingly, it may be found desirable to flute the forward conical face of the head, or otherwise roughen it, to furnish proper frictional engagement between the lock and the head. If desired, the head may be a part separate from the shaft or spindle 14, and formed from rubber or other suitable material. If constructed of rubber or similar frictional material, it may not be necessary to flute or roughen the forward portion thereof. It is suggested also, that the head 15 and the spiral blades of the impeller might desirably be molded in a single piece, utilizing one of the commonly known plastics, the entire assembly being tightly fitted or otherwise securely mounted upon the forward end of the spindle. If the head be formed as an integral part of the spindle, the blades might conveniently be constructed of sheet metal and applied to the spindle by soldering, brazing, or fitting them into spiral grooves or channels formed in the spindle between the bearing 12 and the head 15. The particular manner in which the head and the impeller are fabricated, is of no material consequence and might accordingly be performed in accordance with known engineering practices.

As will readily be understood from the foregoing description, the head, the impeller and the spindle 14 are adapted to be rotated unitarily by the force of air entering the nozzle through the inlet port 9, so that no direct motive power connection to a prime mover is necessary. It is important that rotation of the lock detacher be free of frictional resistance, and to that end the thrust bearing 12 and the end bearing 13 are preferably of the anti-friction type.

Figures 4, 6:
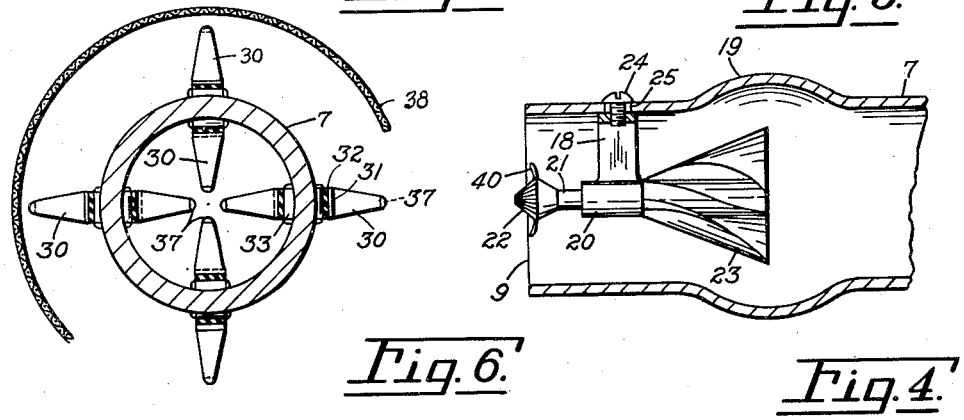
Fig. 4 is a view similar to Fig. 2, showing a modification.
Fig. 6 is a cross-sectional view taken on line 6—6 of Fig. 5.

In the modified form illustrated by Fig. 4, the bracket 18 is located in advance of the enlargement 19 of the nozzle, and it carries an anti-friction thrust and lateral bearing 20 for supporting the spindle 21 intermediate the head 22 and the impeller 23. The head and the impeller of Fig. 4 are characteristically the same as the corresponding parts in Fig. 2. In both cases, the bracket may be secured within the nozzle using any desired form of fastening means, such as screws 24. It may be noted that the lock detacher head preferably projects slightly forwardly of the nozzle, the amount of projection being governed or adjusted by providing a slot 25 in the body of the nozzle where the bracket screw 24 enters to clamp the bracket in position. If desired, the lock detacher head may be furnished with a plurality of radially extending fingers 40 to engage the lock and assist in its removal from the plant. Similar fingers may be applied to the head 15 of Fig. 2, if desired.

Figure 5:
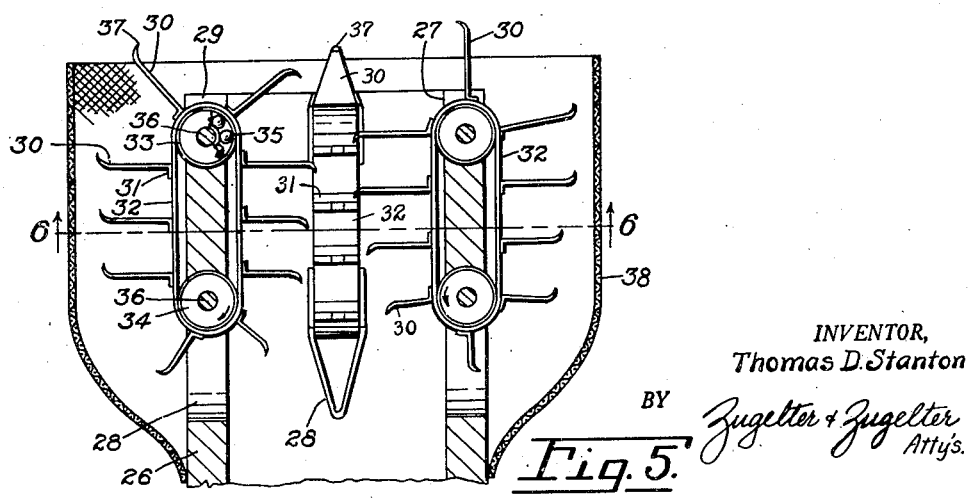
Fig. 5 is an enlarged fragmental cross-sectional view of a second modification of the nozzle element.

In that form of the device illustrated by Figs. 5 and 6, the tubular nozzle is indicated at 26, and is provided with the inlet port 27. At the locations 28 and 29, the material of the nozzle may be cut away to provide transverse openings through which may move the series of paddle-like picker fingers 30, the purpose of which is to grasp the lock and detach it from the plant.

Referring to the left side of Fig. 5, it may be noted that the picker fingers 30 are furnished in groups, and each has a base portion 31 securely attached to the outer surface of a flexible endless belt or the like 32 trained over a pair of pulleys or rollers 33 and 34. The pulleys or rollers preferably are mounted for free rotation upon anti-friction bearings 35 supported within the openings 29 and 28, as upon shafts 36, and are spaced apart sufficiently to dispose of a number of picker fingers within the nozzle where said fingers may be acted upon by a current of air entering the inlet port 27, to drive the belt 32 and thereby rotate the pulleys 33 and 34. As there is no appreciable counter-force acting upon the picker fingers located outside the nozzle 26, the force of air entering the forward end of the nozzle will actuate the picker finger assembly without substantial opposition, and the lock detacher constituted of the several sets of picker finger assemblies will remain in operation as long as a vacuum is maintained within the nozzle.

Although as illustrated by Fig. 6, the nozzle may be furnished with a lock detacher comprising four sets of picker finger assemblies, the number of such assemblies may be increased or decreased as may be desired. The free ends of the picker fingers may be turned in the direction of advancement of the fingers when actuated, as indicated at 37, to grip the lock and ensure its separation from the plant. It should be noted that the structure of Figs. 5 and 6 is actuated solely by the current of air entering the inlet port 27 of the nozzle, and that no auxiliary driving means is necessary.

In order to protect the picker fingers from injury in the event that the nozzle is dropped from the hands of the operator, or placed upon the ground when not in use, the forward end of the nozzle may be furnished with a guard 36 that encloses all of the picker fingers. The guard 38 may be of any desired construction, and is conveniently formed of wire or screening material as indicated, to provide a cylindrical open-ended cage or bell.

In practice, the nozzle 7 or 26 is connected with a suitable vacuum supply, preferably by means of a flexible hose such as 8, and as the inrush of air through the nozzle acts upon the lock detacher, the latter will be actuated with considerable speed. By advancing the nozzle toward the plant until the lock detacher grips the lock, an immediate separation of the lock from the plant will be effected, while at the same time the suction in the nozzle will carry the detached mass of cotton past the detacher and advance it through the nozzle and the flexible hose connection until it is finally deposited in an accumulator or other container. With respect to the device of Figs. 5 and 6, the pickers 30 will be seen to have different lengths, by preference, in order to perform an intermittent grasping function as will be more fully explained in the description of Figs. 7 to 10.

Referring to Figs. 7–10, the character 40 indicates the nozzle of a modified form of the device, corresponding to the nozzle of Fig. 1. Nozzle 40 may desirably be provided with an open end portion 41 which is angular in cross-section, for example, hexagonal, as shown. This provides a series of flat facets to facilitate mounting of the several bearing standards 42—42—43, and to effectually accommodate a series of picker elements 45 at the angular corners 44. The picker elements 45 are all similar, and each may take the approximate form illustrated by Fig. 8 or Fig. 9, as desired. As shown in Fig. 8, the picker element consists of a flat disc or plate of cam shape, having a heel 46 and a toe 47. About the periphery thereof, the disc or plate may carry a series of hooks or grippers 48 in the form of stiff wires or the like, bent to present free ends extending in the direction of rotation of the disc or plate. The disc or plate may be modified as to shape, if desired, but it is important that same be mounted eccentrically upon a flexible shaft 49, as shown.

The modified form of picker element illustrated by Fig. 9 differs from that of Fig. 8 in that it includes grippers 50 formed integrally with the material of the disc or plate. In both cases, the disc or plate preferably is constructed of a flexible and resilient rubber-like substance, although it may be formed from a material of greater rigidity, if desired.

The several bearing standards extend radially inwardly toward the axis of the nozzle, and each includes a bearing 51 to rotatably support the substantially circular flexible shaft 49. Said shaft may be formed from any suitable material commonly used in the fabrication of flexible shafting, for example steel wire or a rubber-like substance, or a combination of both. The picker elements of Figs. 8 and 9 are fixedly mounted upon the shaft in spaced relationship, and in such manner that the toes of all the picker elements extend radially outwardly from the shaft as illustrated by Fig. 7. By rotating the shaft 180 degrees, the toes of all the picker elements assume the positions of the broken lines 450, at which the central portion of the nozzle is constricted thereby. From the foregoing, it will be understood that continuous, unidirectional rotation of the flexible shaft will alternately dispose the toes of all the picker elements outwardly and inwardly, to produce an intermittent grasping and releasing action upon a lock of cotton presented to the open end of the nozzle. The pins or projections on the picker elements are thereby caused to grasp the cotton while the nozzle mouth in effect contracts thereon, and as the cotton is thereby detached from the plant, the pins or projections carry the detached lock of cotton into the center of the nozzle where the suction acts upon it to release the lock from the pins or projections. The detached lock of cotton then travels through the flexible hose for deposit in the accumulator as heretofore explained.

It may here be noted that the above described contracting and expanding of the nozzle mouth in alternation, characterizes not only the device of Fig. 7, but also the device of Fig. 5. In the device of Fig. 5, the desired effect is obtained by making the picker fingers or elements 30 of progressively reduced lengths, as previously explained and as shown in the drawing. If the pickers of Fig. 5 are all of the same length, they will perform in a manner such as would result from mounting the discs 45 concentrically upon the flexible shaft 49, all of which is contemplated within the scope of the present invention. The invention comprehends also the possibility of omitting the wires or projections from the picker elements of Figs. 8 and 9, when necessary or desirable.

Any suitable means may be provided for effecting unidirectional rotation of the flexible shaft 49, and as an example of such means there is illustrated a motor 52 within a housing 53 attached to the nozzle in any suitable manner, said motor having a flexible drive shaft 54 operated to rotate a worm 55 in mesh with a gear 56. The gear 56 is fixed to the flexible shaft 49, and will rotate said shaft whenever the motor 52 is in operation, with the result that the picker elements perform the grasping and releasing functions in alternation, as before explained. Gearing 55—56 is preferably housed within the hollow bracket or standard 43, to protect it from the destructive effects of dirt and other foreign matter.

It should be understood that motor 52 may be operated electrically, pneumatically, or in any other manner, the type of motor employed being wholly immaterial to the invention. In the event that the motor is of a high speed type, its drive shaft may be associated with reduction gearing, (not shown), within the gear box 57, for operating the picker elements at an effective moderate speed.

When necessary or desirable, the nozzle of Figs. 7–10 might be constructed so as to incorporate a rotary lock detacher head such as is illustrated at 15 of Fig. 2, or at 22 of Fig. 4. Such head may be driven by the current of air entering the nozzle, as explained in connection with Figs. 1 to 4, or it may be driven by mechanical means of any suitable character. As herein illustrated by way of example, a mechanical means for rotating the detacher head 58 may comprise an extension 59 of drive shaft 54, carrying a miter gear 60 meshing with a second miter gear 61 on the detacher head shaft 62. This is plainly illustrated by Fig. 10, wherein the group of eccentric picker elements has been omitted for purposes of simplicity and clarity of understanding. The shaft extension 59, and gearing 60—61 may be enclosed within a narrow supplementary housing 63, which might be detachably mounted in superposed relationship upon the standard 43.

As before stated, the nozzle assembly of Figs. 7-10 may be used with or without the central housing 63 and its enclosed shafts and gearing. Common screws may secure the housing 63 in place upon the top of standard 43, and a readily disconnectable drive may be effected between the worm 55 and the lower end of shaft 59 by squaring the end of said shaft and fitting it into a squared hole in the top of the worm. The particular form of this connector, however, is a matter of immateriality to the invention.

In Fig. 10, the character 64 indicates rivets, screws, or other fasteners for mounting the bearing standards upon the nozzle, as indicated at 42 of Fig. 7. The character 65 indicates a coupling for the opposite ends of flexible shaft 49. Of course, this coupling might as readily be provided at the hub of gear 56, if desired.

The number of picker elements employed, and the number and type of bearings required for supporting the flexible shaft 49, are matters of choice or design. Likewise, the cross-sectional shape and size of the nozzle may be varied, along with the manner of supporting the motor housing, without departing from the invention. It will be understood, of course, that the various forms of nozzles illustrated and described herein are intended for attachment to a flexible suction hose or conduit, as indicated upon Fig. 1 of the drawings.

Suction means for the nozzles may consist of a fan or blower 67 arranged to discharge through a pipe 68 into an accumulator 69, wherein the cotton is deposited after harvesting. The accumulator may comprise a box-like container of porous material, or one provided with a breather opening 70 for relieving air pressure therein as the cotton is deposited and accumulated. The fan may be driven by a suitable motor 71 belted as at 72 to the fan pulley 73.

A suction inlet manifold for the fan is indicated at 74, and to this manifold are connected the branch conduits 75 and 76. Conduit 75 may be in the form of a rigid tube extending rearwardly and terminating in a multiple fixture 77 to which may be connected suction hoses such as 8 of Fig. 1. The conduit 75 may be supported upon the accumulator, as shown.

Branch conduit 76 may be in the form of a flexible hose arranged to convey cotton by vacuum force from the rigidly connected branch conduits 79 and 80. The conduits 79 and 80 are inflexible and possess sufficient strength to perform as shafts between which a draft animal may be harnessed for drawing the vehicle upon which the suction means is mounted. The wheels of the vehicle are indicated at 81, 82 and 83, and are so spaced as to span two rows of cotton plants, with the single front wheel 81 running between the rows. The front wheel fork 86 is pivoted upon the chassis 84 at the location 85, so that it steers by means of the shaft arrangement 79—80. The shafts may each terminate in a multiple connection fixture 87 to which hoses such as 8 may be attached.

The rigid tubes 79 and 80 are in communicative relationship with a transverse tube 88 which may be rockingly supported by means of the hangers 89 of the front wheel fork assembly. An upstanding rigid tube section 90 communicating with the transverse tube 88, is coupled to the suction branch 76 leading to the fan housing. Branch 76 may be coiled as at 78, or otherwise adapted to compensate for movements of the shaft tubes in directing the vehicle.

From the foregoing, it will be understood that the vehicle may be drawn through the field in straddling relationship over two rows of cotton plants, with the shafts of the vehicle and the pipe 75 providing for a multiplicity of suction hose connections, whereby a gang of workers may quickly and easily harvest the cotton crop. Each worker will manipulate one or more nozzles of the invention, mounted upon flexible hoses 8 connected to the various suction couplings of the accumulator. Assuming a substantial length of the flexible hoses 8, a large area of the field may be progressively covered in harvesting the crop. The use of the improved nozzles herein disclosed serves to expedite the operation of picking the cotton, while at the same time sparing the workers a great deal of fatigue and unnecessary labor. It will be found also that use of the invention ensures a clean crop harvest substantially free of undesirable leaves, twigs, stones, and other trash which nozzle will not readily accept. These and other advantages of the invention will readily be appreciated by persons conversant with the art of harvesting cotton and similar commodities.

Adaptation of the invention to the picking of all kinds of edible and inedible fruits, as well as the blooms or flowers of plants as herein explained with cotton as the example, is a matter within the scope and spirit of the present invention. The terms "fruit," or "harvestable products" are used in the broadest sense, to include any useful plant product to which the device of this invention may be applicable for harvesting, whether the fruit or product be fleshly or dry in character. It is to be understood that various modifications and changes in the structural details of the apparatus may be made, within the scope of the appended claims, without departing from the invention.

What is claimed is:

1. A harvesting apparatus comprising in combination, a suction nozzle having an open end, flexible rotary disc means at the open end of the nozzle to perform an intermittent grasping and releasing action upon a harvestable product brought into close proximity to the nozzle end, and a central detacher in the form of a rotary burr to twist the harvestable product substantially simultaneously with the action of the grasping and releasing means, the rotary disc means surrounding the detacher and being adapted to grasp the product as the detacher twists the product and direct the product into the suction nozzle.

2. Apparatus for harvesting cotton from a cotton plant which comprises a suction nozzle having an open end, a rotary burr for detaching a cotton boll from the cotton plant, said burr being mounted centrally of and adjacent the open end of the suction nozzle, said burr engaging and twisting the cotton boll to free the boll from the cotton plant, a circular flexible shaft, means for mounting said shaft in the open end of the suction nozzle, the shaft being rotatable axially, means for rotating said shaft about its axis and a plurality of rotary gripping members mounted on said shaft to rotate therewith, each of said gripping members having a finger which swings toward and away from the detacher as the shaft turns about its axis, said fingers being adapted to grasp the boll as the detacher twists the boll and direct the boll into the suction nozzle.

3. Apparatus for harvesting cotton from a cotton plant which comprises a suction nozzle having an open end, a rotary burr for detaching a cotton boll from the cotton plant, said burr being mounted centrally of and adjacent the open end of the suction nozzle, said burr engaging and twisting the cotton boll to free the boll from the cotton plant, a circular flexible shaft, means for mounting said shaft in the open end of the suction nozzle, the shaft being rotatable axially, means for rotating said shaft about its axis, and a plurality of rotary gripping members mounted on said shaft to rotate therewith, each of said gripping members having a finger which swings toward and away from the detacher as the shaft turns about its axis, the fingers of the gripping members swinging inwardly and outwardly together, said fingers being adapted to perform an intermittent grasping and releasing action upon the cotton boll as the detacher twists the boll and direct the boll into the suction nozzle.

4. Apparatus for harvesting cotton from a cotton plant which comprises a suction nozzle having an open end, a circular flexible shaft mounted inside and adjacent the open end of the suction nozzle, the shaft being rotatable axially, means for rotating said shaft about its axis and a plurality of rotatable gripping members mounted on said shaft to rotate therewith, each of said gripping members having a finger which swings inwardly and outwardly as the shaft rotates, the fingers of the gripping members swinging inwardly and outwardly together to perform an intermittent grasping and releasing action upon a cotton boll to grasp the cotton boll and direct the boll into the suction nozzle.

THOMAS D. STANTON.

REFERENCES CITED

The following references are of record in the file of this patent:

UNITED STATES PATENTS

| Number | Name | Date |
|---|---|---|
| 572,611 | Neighbours | Dec. 8, 1896 |
| 848,967 | Chew | Apr. 2, 1907 |
| 869,703 | Gaston | Oct. 29, 1907 |
| 1,096,325 | Stewart | May 12, 1914 |
| 1,247,387 | Fodrea | Nov. 20, 1917 |
| 1,253,774 | Boig | Jan. 15, 1918 |
| 1,351,398 | Newman | Aug. 31, 1920 |
| 1,355,786 | Skillins | Oct. 12, 1920 |
| 1,395,644 | Knox | Nov. 1, 1921 |
| 1,426,326 | Stukenborg | Aug. 15, 1922 |
| 1,684,981 | White | Sept. 18, 1928 |
| 1,736,233 | Thurman | Nov. 19, 1929 |
| 1,844,785 | Nelson | Feb. 9, 1932 |
| 2,354,356 | Ashton | July 25, 1944 |